(12) United States Patent
Braun

(10) Patent No.: US 7,931,132 B2
(45) Date of Patent: Apr. 26, 2011

(54) DAMPER

(75) Inventor: Sigmund Braun, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1055 days.

(21) Appl. No.: 11/673,721

(22) Filed: Feb. 12, 2007

(65) Prior Publication Data
US 2007/0251776 A1 Nov. 1, 2007

(30) Foreign Application Priority Data

Apr. 26, 2006 (DE) .......................... 10 2006 019 307

(51) Int. Cl.
*F16F 9/32* (2006.01)
(52) U.S. Cl. ............ 188/266.7; 188/322.15; 188/322.22
(58) Field of Classification Search ............... 188/266.7, 188/266.1, 299.1, 322.13, 322.15, 322.22; 267/64.11, 64.13
See application file for complete search history.

(56) References Cited

U.S. PATENT DOCUMENTS

| | | | | | |
|---|---|---|---|---|---|
| 5,129,489 | A | * | 7/1992 | Majima et al. ............. | 188/266.7 |
| 5,996,745 | A | * | 12/1999 | Jones et al. ................. | 188/266.7 |
| 2006/0086580 | A1 | * | 4/2006 | Fleischer et al. ........... | 188/266.1 |

FOREIGN PATENT DOCUMENTS

| | | | | |
|---|---|---|---|---|
| GB | 2193785 | A | * | 2/1988 |
| JP | 01055445 | A | * | 3/1989 |
| WO | WO-03/100290 | A1 | * | 12/2003 |

* cited by examiner

*Primary Examiner* — Pam Rodriguez
(74) *Attorney, Agent, or Firm* — Ronald E. Greigg

(57) ABSTRACT

The invention relates to a damper having a damper cylinder, in which a piston ram is guided via a piston rod, and for adjusting characteristic damper values, the flow of a damper fluid can be controlled. A piezoelectric valve is disposed inside the damper cylinder, and includes a piezoelectric element and an actuator, and an evaluation and control circuit for adjusting the flow of the damper fluid triggers the actuator via the piezoelectric element.

20 Claims, 5 Drawing Sheets

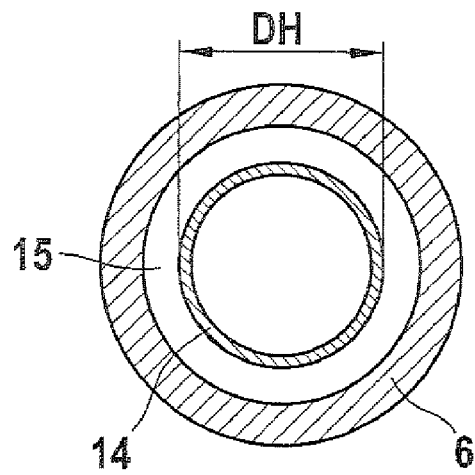 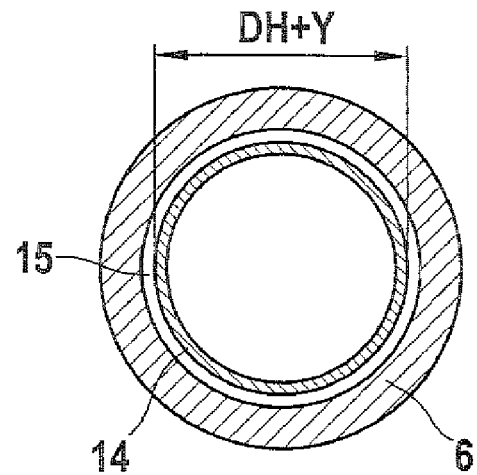
Fig. 4a  Fig. 4b
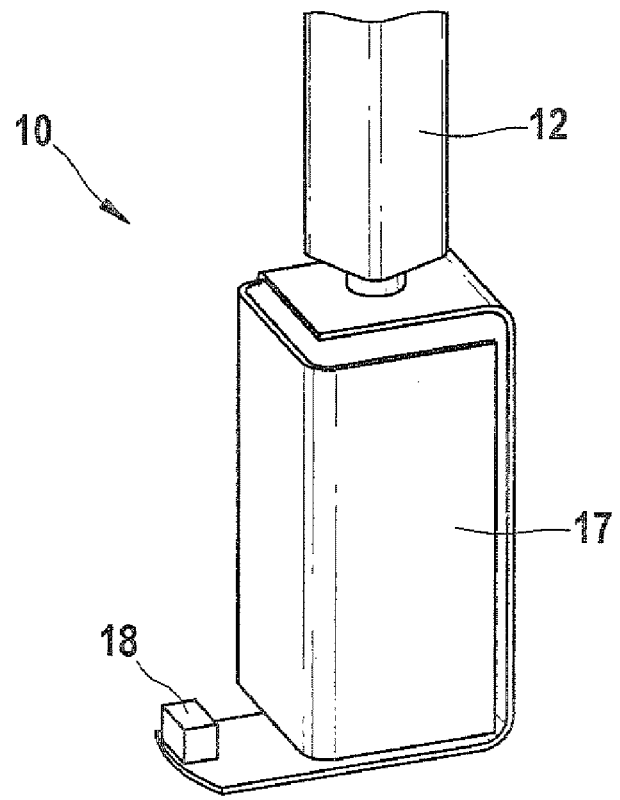
Fig. 5

DAMPER

REFERENCE TO FOREIGN PATENT APPLICATION

This application is based on German Patent Application No. 10 2006 019 307.5 filed 26 Apr. 2006, upon which priority is claimed.

BACKGROUND OF THE INVENTION

1. Field of the Invention

The invention is directed to an improved damper or shock absorber embodying a piezoelectric valve disposed inside the damper.

2. Description of the Prior Art

From the prior art, dampers for vehicles are known whose characteristic shock absorber values can be adjusted via hydraulic proportional valves and adapted to various driving situations. These proportional valves continuously control the fluid flow in the damper, for instance with the aid of a control piston that is moved by an exciter coil. The proportional valves are either flanged to the damper or integrated in the piston ram of the damper. An additional sensor, which is disposed on the wheel suspension, furnishes information about the state of indentation of the damper. Acceleration sensors or travel sensors with a transmission connecting rod can be used as sensors. Associated evaluation and control units are either disposed centrally in the vehicle or can be located in decentralized form on the flanged-on proportional valve. The proportional valve can control the main fluid flow indirectly, for instance; that is, a small secondary flow is regulated directly by a small control piston and forms a pressure difference compared to the main valve. On the basis of this regulated pressure difference, the main fluid flow in the main valve is established. The reaction time of the damper is limited by the transient response of the proportional valve.

OBJECT AND SUMMARY OF THE INVENTION

The damper of the invention has the advantage over the prior art that a piezoelectric valve, which includes a piezoelectric element and an actuator, is disposed inside a damper cylinder. To adjust characteristic damper values, an evaluation and control circuit controls a flow of damper fluid via the piezoelectric element and the actuator actuated by the piezoelectric element. The damper of the invention can accomplish full integration of the piezoelectric element, actuator and evaluation and control circuit to make a compact piezoelectric valve, which in contrast to the known hydraulic proportional valve advantageously enables direct control of the main fluid flow practically without delays or transient states. The piezoelectric valve advantageous has extremely short reaction times.

By the provisions and refinements disclosed, advantageous improvements to the damper are possible. It is especially advantageous that the piezoelectric element, via a change in length, varies a cross section of the actuator, as a result of which a flow cross section in the piston ram for the damper fluid is adjustable. The actuator is preferably embodied as a rounded hollow body of an elastic material, which is disposed inside the piston ram. The actuator has an outer diameter that is adjustable between a minimum value and a maximum value. Because the hollow body is embodied from an elastic material, such as sheet metal with spring properties, automatic restoration of the hollow body jacket to its outset position advantageously occurs when the compression forces let up.

In a feature of the damper of the invention, the variable outer diameter of the hollow body, together with a constant inside diameter of the surrounding piston ram, generates the variable flow cross section, embodied as an annular cross section, which establishes the communication for the damper fluid between a lower damper chamber and an upper damper chamber in the damper cylinder. The actuator is advantageously embodied such that its structural design makes a simple realization of an overpressure protection possible. In the case of an impermissible increase in pressure, the jacket face of the hollow body can for instance briefly deform in such a way that a shockwave can pass through the annular cross section, and the components involved are not damaged.

In a further feature of the damper, the piezoelectric element compresses the actuator via e change in length, so that the outer diameter of the actuator, beginning at the minimum outer diameter is variable. Alternatively, the piezoelectric element stretches the actuator via the change in length, so that the outer diameter of the actuator), beginning at the maximum outer diameter is variable.

In a further feature of the damper of the invention, the piezoelectric valve includes a travel sensor, whose signals can be evaluated by the evaluation and control circuit for determining an absolute position of the piston ram in the damper cylinder. Besides the function as the actuator, the self-contained hollow body can also serve as a housing for the evaluation and control circuit, and this circuit can include a flexible printed circuit board. The piezoelectric element is for instance embodied as a tubular stacked piezoelectric element, whose change in length is adjustable by means of a voltage applied via a connecting cable. By means of an inner bore in the tubular piezoelectric element, the connecting cable can be extended to the outside from the evaluation and control unit through a bore in the piston rod. One possible structural embodiment of the piezoelectric valve is a compact, fully integrated unit comprising the actuator, evaluation and control circuit, and sensor. Alternatively, the evaluation and control circuit may be disposed at some other point, for instance in a control unit located outside the damper The voltage applied to the piezoelectric element is for instance proportional to the flow resistance of the damper fluid through the flow cross section in the piston ram and makes setting of the damper force possible.

BRIEF DESCRIPTION OF THE DRAWINGS

The invention will be better understood and further objects and advantages thereof will become more apparent from the ensuing detailed description of preferred embodiments, taken in conjunction with the drawings, in which:

FIGS. 4a and 4b are each a sectional view of the piston ram, taken along the line IV-IV in FIG. 3; and FIG. 5 is a perspective view of a piezoelectric valve of the invention for the damper of FIG. 1.

DESCRIPTION OF THE PREFERRED EMBODIMENTS

Figure 1:
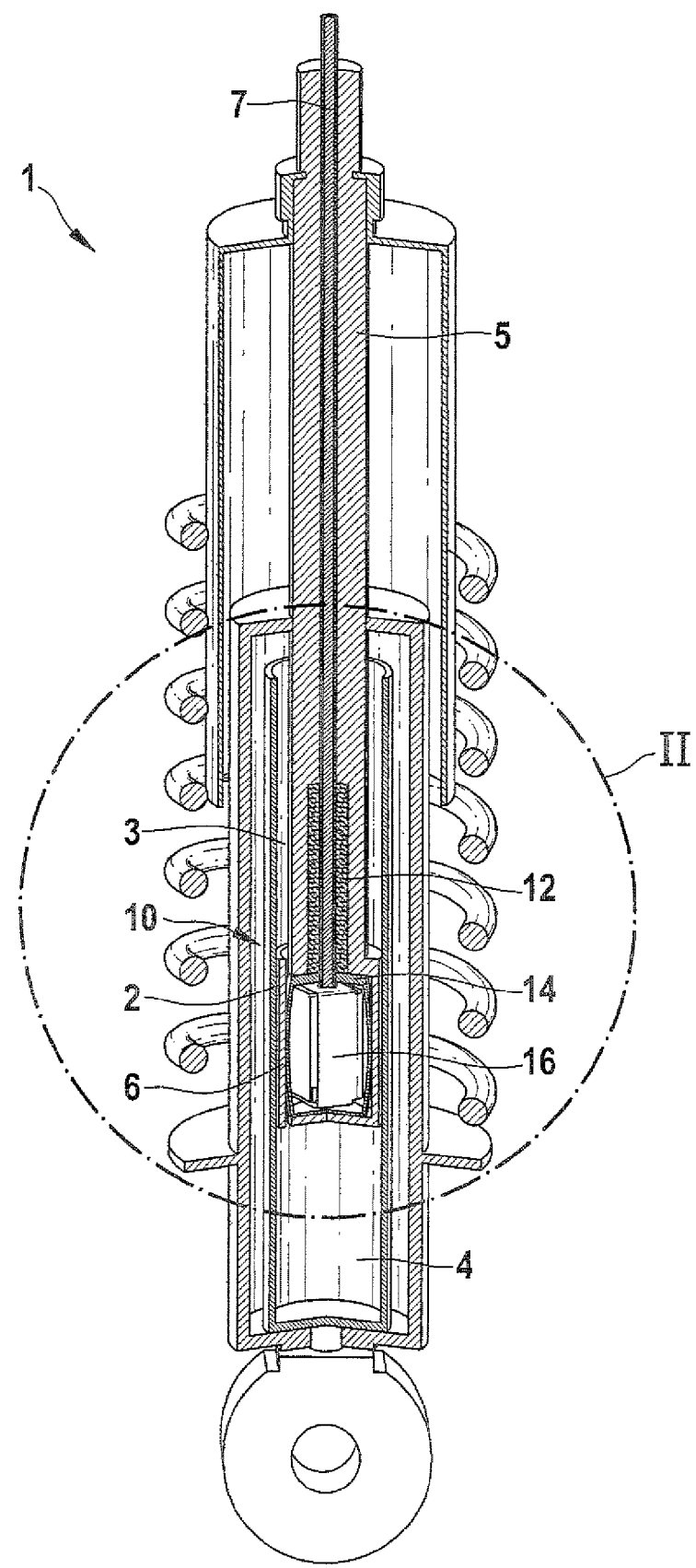
FIG. 1 is a perspective sectional view of a damper according to the invention.
Figure 2A:
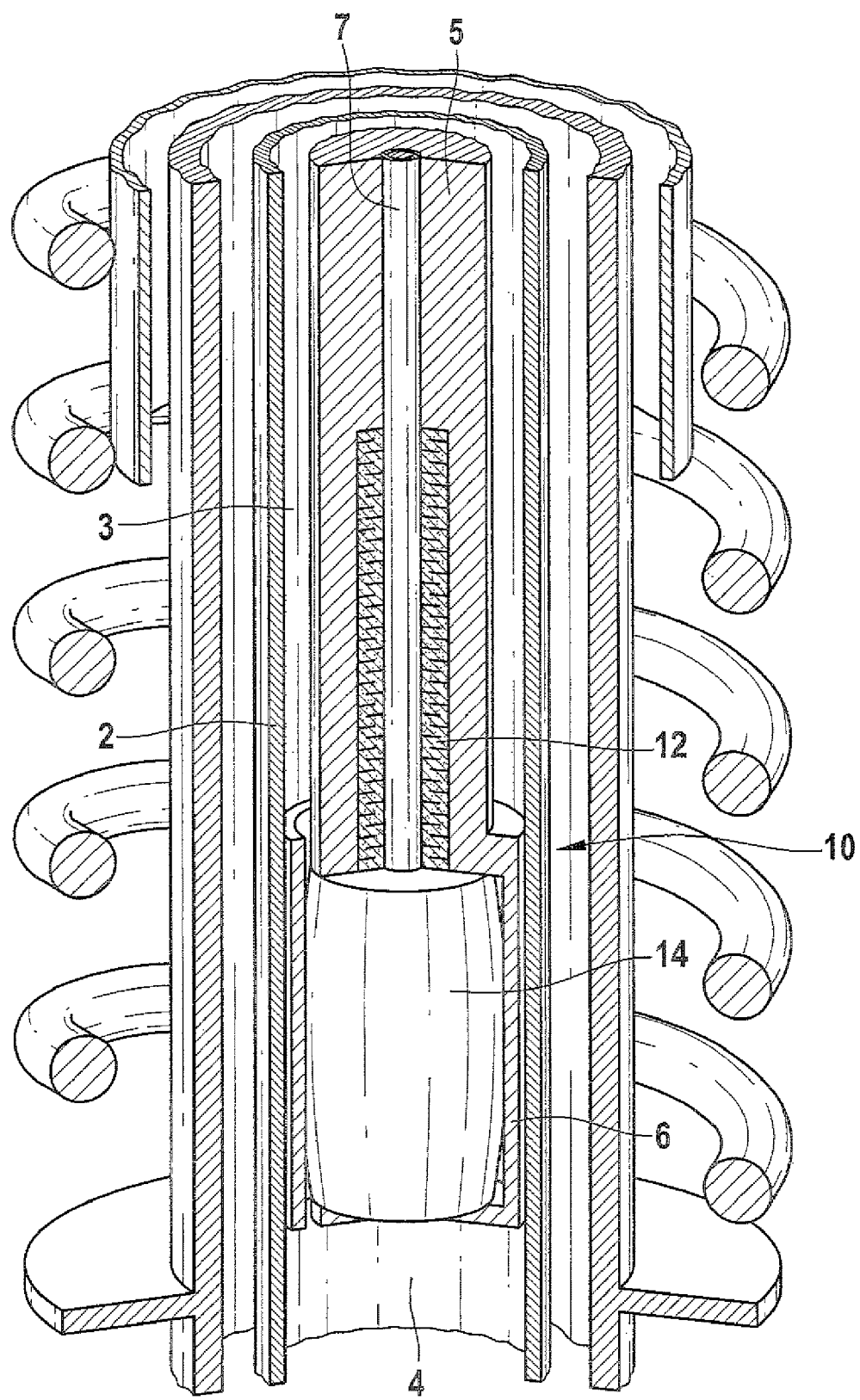
FIGS. 2a and 2b are each a perspective sectional view of a detail II in FIG. 1.
Figure 2B:
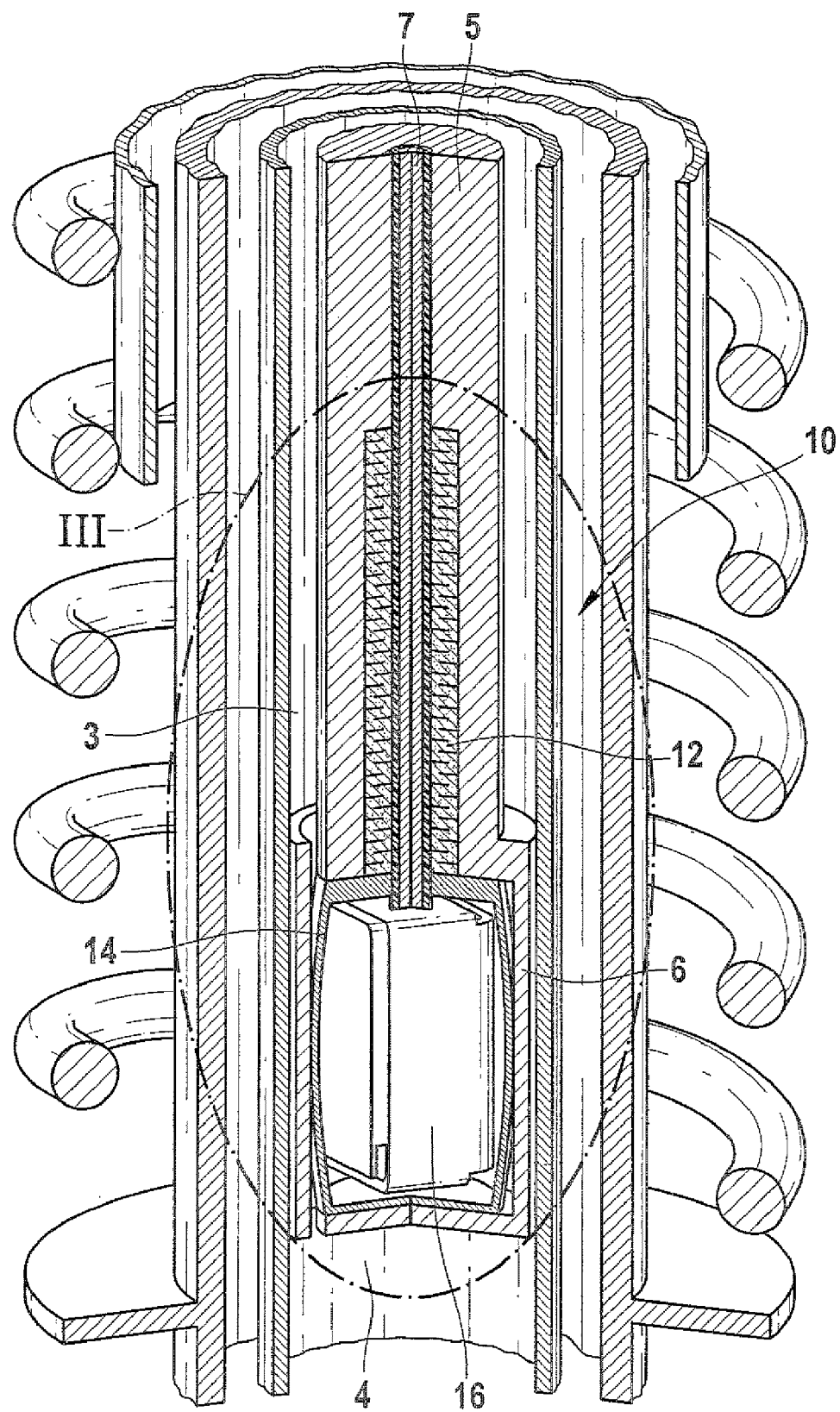

As can be seen from FIGS. 1, 2a, and 2b, a damper 1, such as a shock absorber for a vehicle, includes a damper cylinder 2, in which a piston ram 6 is guided via a piston rod 5. For adjusting characteristic damper values, the flow of a damper fluid from a lower damper chamber 4 through the piston ram 6 into an upper damper chamber 3 and vice versa is controlled by a piezoelectric valve 10 disposed inside the damper cylinder 2. The piezoelectric valve 10 includes a piezoelectric element 12, embodied as a tubular stacked piezoelectric element; an actuator 14, embodied as a rounded hollow body: and an evaluation and control circuit 16, which here is disposed inside the actuator 14. The evaluation and control circuit 16 triggers the actuator 14 via the piezoelectric element 12 for adjusting the flow 20 of damper fluid. In an alternative embodiment of the invention, not shown, the evaluation and control circuit 16 is disposed outside the damper 1, in a control unit.

Figure 3:
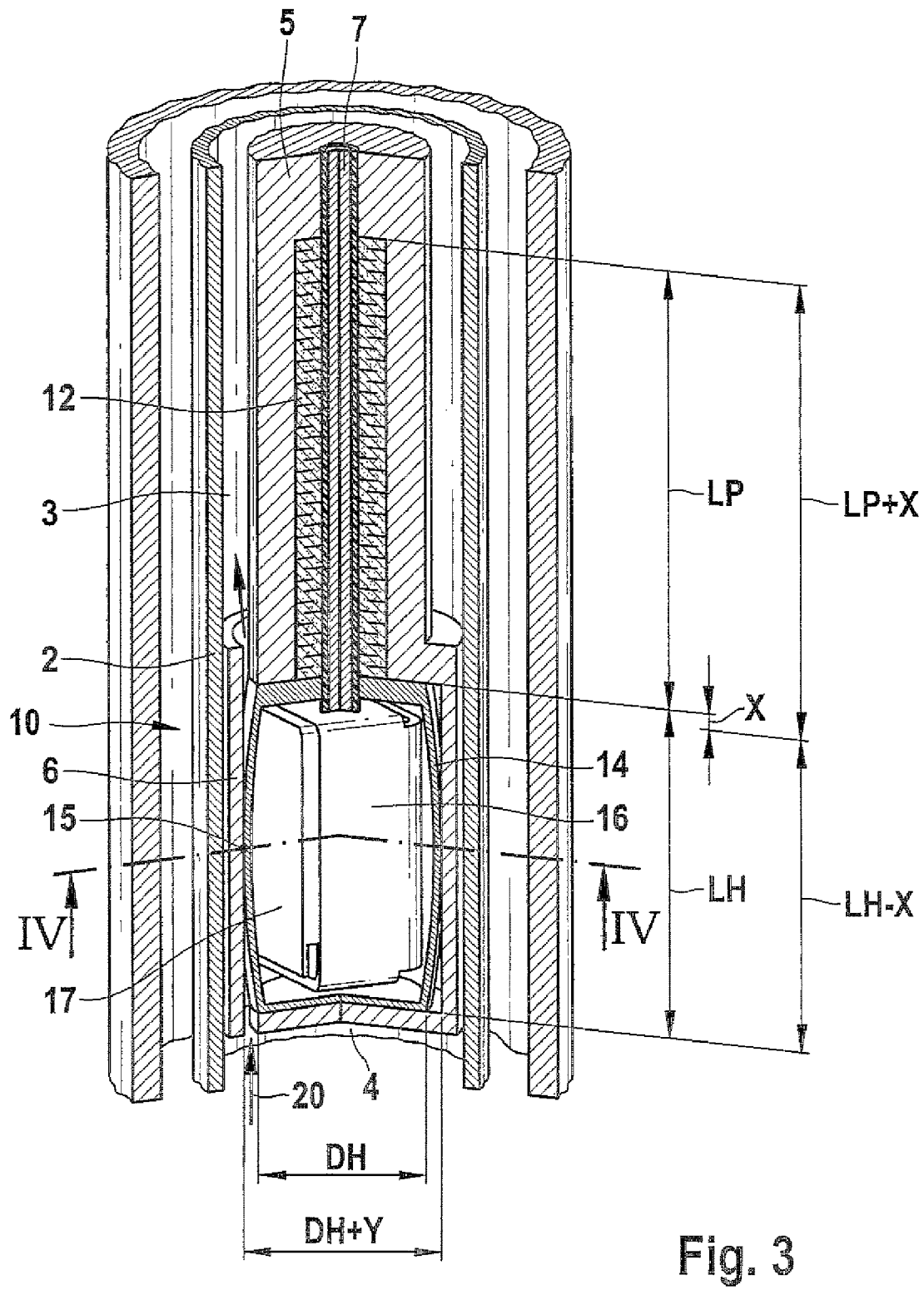
FIG. 3 is a perspective sectional view of a detail III in FIG. 2b.

The mode of operation of the damper 1 of the invention is described below in conjunction with FIGS. 3, 4a, and 4b. As can be seen from FIG. 3, the tubular stacked piezoelectric element 12 is accommodated in a suitable recess on the lower end of the piston rod 5 in such a way that it is braced on the top side against the piston rod 5 and, by the stretching of its external geometry LP, it generates an axial relative motion with the change X in length. This movable side of the piezoelectric element 12 presses against the top side of the actuator 14, which is embodied as a rotationally symmetrical hollow body and is disposed in the cylindrical piston ram 6. The underside of the hollow body 14 is braced against the bottom of the piston ram 6. Because of the fixed support of the hollow body 14 on the underside and the movable bracing against the piezoelectric element 12 on the top side, the hollow body 14, with a total height LH, is upset by the change X in length as a functional of the change X in length of the piezoelectric element 12, so that its jacket face is deformed. To enable the deformation of the jacket to be done in a controlled way, the jacket face of the hollow body 14 is embodied in rounded fashion; that is, when a pressure is exerted on the hollow body 14, the outer diameter of the hollow body 14 increases, from a minimum outer diameter DH to a maximum outer diameter DH+Y, as can be seen from FIGS. 4a and 4b; the value Y corresponds to a maximum increase in the hollow body diameter caused by a maximum longitudinal compression X. If an elastic material, such as sheet metal with spring properties, is used for the jacket face of the hollow body 14, then when the pressure forces let up, an automatic restoration of the jacket of the hollow body 14 occurs, so that the outer diameter of the hollow body resumes its initial value DH.

The variable jacket diameter of the hollow body 14, together with the constant inside diameter of the surrounding piston ram 6, forms a variable annular cross section 15, as can be seen in FIGS. 4a and 4b. This annular cross section 15 represents the communication through which the damper fluid, such as a hydraulic oil, can flow from the lower damper chamber 4 into the upper damper chamber 3 and vice versa. Since the voltage to be applied to the piezoelectric element 12 is proportional to the flow resistance of the damper fluid, the applied voltage can advantageously be utilized to regulate the damper force.

In the event of an impermissible pressure increase, the jacket face of the hollow body 14 can deform briefly in such a way that a shockwave can pass through the annular cross section 15, and the components involved are not damaged. Besides its function as an actuator 14, the self-contained hollow body 14 here also serves as a housing for the evaluation and control circuit 16.

Disposing a travel sensor 18 in the hollow body 14 is also an attractive option, because here two parts that are movable relative to one another, such as the piston ram 6 and the inner wall of the damper cylinder 2, are in the immediate vicinity of one another. By the use of the travel sensor 18, the piston ram position in the damper 1 can be advantageously determined absolutely.

Through the inner bore of the tubular piezoelectric element 12, the connecting cable 7 can be extended at the outside from the evaluation and control circuit 16 through a bore in the piston rod 5. The structural version described here represents a compact, fully integrated unit 10 comprising the actuator 14, evaluation and control circuit 16, and sensor 18. The evaluation and control circuit 16 is embodied for instance as a flexible printed circuit board 17, which facilitates the disposition inside the hollow body 14.

FIG. 5 shows one possible disposition of the flexible circuit board 17 of the evaluation and control circuit 16, the travel sensor 18, and the tubular stacked piezoelectric elements 12, in which the flexible circuit board 17 and the travel sensor 18 are disposed in the interior of the hollow body 14. Openings and/or windows for the travel sensor 18 can be disposed in the hollow body 14 and in the piston ram 6, so that the travel sensor 18 can sense the relative motions between the piston ram 6 and the inner wall of the damper cylinder 2.

In an alternative embodiment, not shown, of the piezoelectric valve, the hollow body is stressed with tension by the change X in length of the piezoelectric element. Here, the piezoelectric element is disposed entirely inside the hollow body, or it protrudes from above into the hollow body through an opening and is braced from inside against the underside of the hollow body. The top side of the hollow body is solidly joined to the piston rod. The underside of the hollow body is freely movable. If the piezoelectric element lengthens by the change X in length because of an applied voltage, then the hollow body likewise stretches by the change X in length, and as a result the maximum outer diameter DH+Y of the hollow body is reduced, and the annular cross section for the fluid flow is increased.

The foregoing relates to preferred exemplary embodiments of the invention, it being understood that other variants and embodiments thereof are possible within the spirit and scope of the invention, the latter being defined by the appended claims.

I claim:

1. A damper having:
a damper cylinder,
a piston ram having a passage which allows flow of a damper fluid therethrough,
a piston rod guiding the piston ram in the damper cylinder,
flow control means for controlling the flow of said damper fluid through said piston ram for adjusting characteristic damper values, the flow control means comprising a piezoelectric valve, disposed inside the damper cylinder, which valve includes a piezoelectric element and an actuator, and
an evaluation and control circuit for adjusting the flow of the damper fluid which triggers the actuator via the piezoelectric element.

2. The damper as defined by claim 1, wherein the piezoelectric element, via a change in length, varies a cross section of the actuator, as a result of which a flow cross section in the piston ram for the damper fluid is adjustable.

3. The damper as defined by claim 2, wherein the piezoelectric element compresses the actuator via said change in length, so that the outer diameter of the actuator, beginning at the minimum outer diameter is variable.

4. The damper as defined by claim 2, wherein the piezoelectric element stretches the actuator via said change in length, so that the outer diameter of the actuator, beginning at the maximum outer diameter is variable.

5. The damper as defined by claim 2, wherein the piezoelectric valve further comprises a travel sensor, whose signals can be evaluated by the evaluation and control circuit for determining an absolute position of the piston ram in the damper cylinder.

6. The damper as defined by claim 2, wherein the actuator is embodied as a rounded hollow body of an elastic material, is disposed inside the piston ram, and has an outer diameter that is adjustable between a minimum value and a maximum value.

7. The damper as defined by claim 6, wherein the piezoelectric element compresses the actuator via said change in length, so that the outer diameter of the actuator, beginning at the minimum outer diameter is variable.

8. The damper as defined by claim 6, wherein the piezoelectric element stretches the actuator via said change in length, so that the outer diameter of the actuator, beginning at the maximum outer diameter is variable.

9. The damper as defined by claim 6, wherein the piezoelectric valve further comprises a travel sensor, whose signals can be evaluated by the evaluation and control circuit for determining an absolute position of the piston ram in the damper cylinder.

10. The damper as defined by claim 6, wherein the evaluation and control circuit is disposed inside the hollow body.

11. The damper as defined by claim 6, wherein the variable outer diameter of the hollow body, together with a constant inside diameter of the surrounding piston ram, generates the variable flow cross section, embodied as an annular cross section, which establishes the passage through which the damper fluid flows between a lower damper chamber and an upper damper chamber in the damper cylinder.

12. The damper as defined by claim 11, wherein the piezoelectric element compresses the actuator via said change in length, so that the outer diameter of the actuator, beginning at the minimum outer diameter is variable.

13. The damper as defined by claim 11, wherein the piezoelectric element stretches the actuator via said change in length, so that the outer diameter of the actuator, beginning at the maximum outer diameter is variable.

14. The damper as defined by claim 11, wherein the piezoelectric valve further comprises a travel sensor, whose signals can be evaluated by the evaluation and control circuit for determining an absolute position of the piston ram in the damper cylinder.

15. The damper as defined by claim 1, wherein the piezoelectric element compresses the actuator via said change in length, so that the outer diameter of the actuator, beginning at the minimum outer diameter is variable.

16. The damper as defined by claim 15, wherein the piezoelectric valve further comprises a travel sensor, whose signals can be evaluated by the evaluation and control circuit for determining an absolute position of the piston ram in the damper cylinder.

17. The damper as defined by claim 1, wherein the piezoelectric element stretches the actuator via said change in length, so that the outer diameter of the actuator, beginning at the maximum outer diameter is variable.

18. The damper as defined by claim 1, wherein the piezoelectric valve further comprises a travel sensor, whose signals can be evaluated by the evaluation and control circuit for determining an absolute position of the piston ram in the damper cylinder.

19. The damper as defined by claim 1, wherein the piezoelectric element is embodied as a tubular stacked piezoelectric element whose change in length is adjustable by means of a voltage applied via a connecting conductor.

20. The damper as defined by claim 19, wherein the voltage applied to the piezoelectric element is proportional to the flow resistance of the damper fluid through the flow cross section in the piston ram and establishes a damper force.

* * * * *